United States Patent
Sternal et al.

(10) Patent No.: US 8,844,683 B2
(45) Date of Patent: Sep. 30, 2014

(54) DISC BRAKE FOR MOTOR VEHICLE

(75) Inventors: Norbert Sternal, Bonn (DE); Michael Walden, Vallendar (DE)

(73) Assignee: Lucas Automotive GmbH, Koblenz (DE)

( * ) Notice: Subject to any disclaimer, the term of this patent is extended or adjusted under 35 U.S.C. 154(b) by 118 days.

(21) Appl. No.: 13/813,327

(22) PCT Filed: Jul. 6, 2011

(86) PCT No.: PCT/EP2011/003365
§ 371 (c)(1), (2), (4) Date: Mar. 21, 2013

(87) PCT Pub. No.: WO2012/016620
PCT Pub. Date: Feb. 9, 2012

(65) Prior Publication Data
US 2013/0206520 A1 Aug. 15, 2013

(30) Foreign Application Priority Data
Aug. 3, 2010 (DE) .......................... 10 2010 033 255

(51) Int. Cl.
| | |
|---|---|
| F16D 65/68 | (2006.01) |
| B60T 1/06 | (2006.01) |
| B60T 13/74 | (2006.01) |
| B60T 7/10 | (2006.01) |
| B60T 7/12 | (2006.01) |
| F16D 65/18 | (2006.01) |
| F16D 123/00 | (2012.01) |
| F16D 121/04 | (2012.01) |
| F16D 121/02 | (2012.01) |
| F16D 121/24 | (2012.01) |
| F16D 125/40 | (2012.01) |

(52) U.S. Cl.
CPC ............. *B60T 1/065* (2013.01); *F16D 2123/00* (2013.01); *F16D 2121/04* (2013.01); *B60T 13/741* (2013.01); *B60T 7/107* (2013.01); *B60T 7/122* (2013.01); *F16D 2121/02* (2013.01); *F16D 2121/24* (2013.01); *B60T 7/108* (2013.01); *F16D 2125/40* (2013.01); *F16D 65/18* (2013.01)
USPC ........................................................ 188/72.6

(58) Field of Classification Search
CPC ................................ F16D 65/18; B60T 1/065
USPC ................................. 188/72.1–72.6, 158, 162
See application file for complete search history.

(56) References Cited

U.S. PATENT DOCUMENTS

| | | |
|---|---|---|
| 3,592,299 A | 7/1971 | Erdmann |
| 4,014,415 A | 3/1977 | Pickel |

(Continued)

FOREIGN PATENT DOCUMENTS

| | | |
|---|---|---|
| DE | 1750176 B1 | 2/1971 |
| DE | 102005051082 A1 | 5/2007 |

(Continued)

*Primary Examiner* — Christopher Schwartz
(74) *Attorney, Agent, or Firm* — MacMillan, Sobanski & Todd, LLC

(57) ABSTRACT

A disc brake for a motor vehicle, wherein the disc brake comprises a housing, a brake disc which can be rotated relative to the housing, at least one friction lining, and at least one actuating device which is configured for bringing about a relative movement between the brake disc and the friction lining, with the result that the friction lining can be brought into contact with the brake disc, wherein the actuating device has at least one actuating piston which is guided displaceably in the housing in a hydraulically sealing manner, wherein the actuating piston can be displaced in the housing hydraulically and via a mechanical actuator. In the disc brake, it is provided that the actuating piston is coupled to the mechanical actuator via an elastically deformable driving arrangement, wherein, as a consequence of a relative displacement between the actuating piston and the actuator, the driving arrangement provides a restoring movement in accordance with its elastic deformation.

13 Claims, 8 Drawing Sheets

(56) References Cited

U.S. PATENT DOCUMENTS

| | | | |
|---|---|---|---|
| 5,613,577 A * | 3/1997 | Collin | 188/72.4 |
| 7,753,178 B2 | 7/2010 | Ohtani et al. | |
| 8,061,491 B2 * | 11/2011 | Tristano et al. | 188/265 |
| 8,069,961 B2 | 12/2011 | Watada | |
| 8,225,910 B2 * | 7/2012 | Piccoli et al. | 188/71.8 |
| 8,322,495 B2 * | 12/2012 | Leiter et al. | 188/72.6 |
| 8,348,023 B2 | 1/2013 | Sakashita et al. | |
| 2007/0062769 A1 | 3/2007 | Noh | |
| 2007/0158148 A1 * | 7/2007 | Ohtani et al. | 188/158 |
| 2009/0014257 A1 | 1/2009 | Watada | |
| 2010/0096222 A1 * | 4/2010 | Kang | 188/72.3 |
| 2010/0163351 A1 * | 7/2010 | Sakashita et al. | 188/182 |
| 2011/0308898 A1 * | 12/2011 | Shiraki | 188/72.4 |
| 2013/0186716 A1 * | 7/2013 | Kong | 188/71.8 |

FOREIGN PATENT DOCUMENTS

| | | |
|---|---|---|
| DE | 102006056346 A1 | 6/2007 |
| DE | 102008037720 A1 | 2/2010 |
| WO | 2010097938 A1 | 9/2010 |

* cited by examiner

DISC BRAKE FOR MOTOR VEHICLE

CROSS-REFERENCE TO RELATED APPLICATIONS

This application is a national stage of International Application No. PCT/EP2011/003365 filed Jul. 6, 2011, the disclosures of which are incorporated herein by reference in entirety, and which claimed priority to German Patent Application No. DE 10 2010 033 255.0 filed Aug. 3, 2010, the disclosures of which are incorporated herein by reference in entirety.

BACKGROUND OF THE INVENTION

The present invention relates to a disc brake for a motor vehicle, wherein the disc brake comprises a housing, a brake disc that is rotatable relative to the housing, at least one friction lining, and at least one actuating device realized to effect a relative movement between the brake disc and the friction lining, such that the friction lining can be brought into bearing contact with the brake disc, wherein the actuating device has at least one actuating piston, which is guided displaceably in the housing in a hydraulically sealing manner, wherein the actuating piston is displaceable in the housing hydraulically and/or via a mechanical actuator.

Such a disc brake is known from the prior art. Thus, for example, the document DE 10 2005 051 082 A1, and corresponding U.S. Pat. No. 8,322,495 B2, both of which are incorporated by reference herein in entirety, describes a corresponding disc brake, which is realized as a floating-calliper disc brake. In that case, a friction lining arrangement, having two opposing friction linings, is provided on both sides of a brake disc. The one brake lining is attached to a floating calliper, whereas the other brake lining can be displaced hydraulically, relative to the floating calliper, by means of an actuating piston. As a consequence of an application of hydraulic load to an actuating piston, the movable brake lining is displaced towards the brake disc. By means of the floating-calliper function, the brake lining that is solid with the floating calliper is drawn against the brake disc from the other side, in a manner known per se, such that a braking force acts upon the brake disc on both sides. However, in this floating-calliper function, which has been known for a long time, this prior art also provides an electromechanical actuating device. This is used to realize a parking brake function. In addition to the hydraulic displacement, with appropriate control the disc brake can also additionally be actuated electromechanically.

However, it has been found that, in the case of such a combination whereby a brake can be actuated hydraulically and electromechanically, as a consequence of a previously effected electromechanical actuation residual drag moments can remain in the system after the release operation, and elaborate, separate measures are needed to suppress them. This is due to the fact that the usual "rollback function" of such a disc brake arrangement that prevents residual drag moments following a hydraulic actuation cannot be fully utilized in the case of the electromechanical actuation, owing to the absence of application of hydraulic pressure. Rollback function means the action of an elastically deformed hydraulic seal, which is usually accommodated in a receiving groove in the housing and which, by means of its inner face, is in adhesive contact with the surface of the actuating piston, this adhesive contact initially preventing the hydraulic seal from sliding off the surface of the actuating piston during an actuating movement relative to the housing. As a result, in the case of this movement, the hydraulic seal, retained in the housing in the receiving groove there, undergoes an elastic deformation, which can relax elastically back into its initial state following abatement of the actuating force and, in so doing, draws the brake piston back into an initial position that is largely without braking action. The deformation capability of the hydraulic seal, i.e. the capability to follow a movement of the actuating piston by an elastic deformation, is in this case limited considerably by the holding forces determining the adhesive contact. This means that, as soon as the holding forces of the adhesive contact are exceeded by the forces that increase continuously during the elastic deformation and that counteract the movement of the actuating piston, the hydraulic seal slides off the surface of the actuating piston. The region of application of the hydraulic seal on the actuating piston is altered as a result, and the actuating piston slides through under the hydraulic seal. It must also be taken into account that, in the case of a hydraulic actuation, the applied pressure, because of the elastic deformation of the hydraulic seal caused as a result, increases the normal force with which the hydraulic seal is pressed on to the surface of the actuating piston, as a result of which the holding forces of the adhesive contact are increased to the same extent, as compared with an electromechanical actuation without application of a hydraulic pressure. In the case of an electromechanical actuation, the absence of deformation resulting from pressure and the correspondingly lesser holding forces can have the result that, for the same amount of movement of the actuating piston, the adhesive contact breaks away before the end position of the actuating piston is attained, owing to the absence of increase in the normal force. As a result, the rollback function, as described above, cannot be fully utilized in comparison with application of a hydraulic force. This can result in unwanted residual drag moments.

BACKGROUND OF THE INVENTION

A feature of the present invention to provide a disc brake arrangement of the type designated at the outset, in which residual drag moments are largely suppressed in any operating mode, in order thereby to improve the functionality in a simple manner, with low production costs.

This feature is achieved by a disc brake of the type designated at the outset, in which it is provided that the actuating piston is coupled to the mechanical actuator via an elastically deformable driving arrangement, wherein, as a consequence of a relative displacement between the actuating piston and the actuator, the driving arrangement provides a restoring movement in accordance with its elastic deformation.

According to the invention, the previously mentioned rollback function is dissociated from the seal between the housing and the actuating piston and is assigned instead to the driving arrangement between the actuating piston and the mechanical actuator. This has the advantage that, in the case of a movement of the mechanical actuator as a consequence of an actuation for the purpose of actuating the parking brake, the driving arrangement is deformed elastically in each case and a rollback function, i.e. drawing back of the actuating piston, can thus be provided. As a result of the brake lining being attached to the actuating piston, for example by means of a fastening spring, the brake lining can be actively drawn back together with the actuating piston. Otherwise, a non-attached brake lining can separate from the brake disc, for example because of the dynamic vibratory forces during travel.

In a development of the invention, it can be provided that the driving arrangement is accommodated with a friction fit in the actuating piston and is movable relative to the mechanical actuator, wherein the mechanical actuator provides a limited movement region in which the driving arrangement is accommodated and is displaceable. It is thereby ensured that the driving arrangement acts on the actuating piston with sufficient forces and therefore provides a driving function in accordance with the current position of the mechanical actuator. The friction fit is realized in such a way that, in the case of sufficiently large forces, with a particular elastic deformation of the driving arrangement being achieved, the static friction of the friction fit is overcome and, ultimately, a relative movement between the driving arrangement and the actuating piston is permitted. What is determinant, however, is that, before attainment of a threshold value at which the static friction is overcome and the actuating piston slips relative to the driving arrangement, there is a sufficiently great elastic deformation of the driving arrangement.

In respect of the movement region, it can be provided that the latter is realized so as to be greater than the axial length of the driving arrangement. This allows a certain movement clearance, in addition to the amount of the elastic deformation of the driving arrangement between the actuating piston and the mechanical actuator. In this context, it can be provided that the distance by which the movement region is realized so as to be greater than the axial length of the driving arrangement determines a functional clearance that is dimensioned in such a way that it provides a restoring movement of the actuating piston as a consequence of a hydraulic brake actuation. Owing to this functional clearance, it is possible, as a consequence of a hydraulic brake actuation, for the actuating piston to be repeatedly guided strongly back in the direction of its initial position, in such a way that the braking action is actually removed and there are no longer any residual drag moments.

In respect of the structural design of the disc brake according to the invention, it can be provided that the movement region is delimited by a flange realized on the mechanical actuator and/or by a stop, in particular a retaining ring, that can be attached to the actuator. In particular, it can be provided that, on at least one side of the movement region, the flange or/and the stop is/are provided with a surface contour whose geometry is realized to achieve a desired deformation of the driving arrangement, for example having a bevel. The selective configuration of the surface contour is particularly appropriate on the side of the movement region that is near the brake lining. In this region, the driving arrangement is deformed in a manner intended to ensure that an automatic restoring movement occurs in order to prevent residual drag moments. A further measure in respect of the configuration of the surface contour is that of avoiding contour shapes that promote wear, in particular edges, which can negatively affect the service life of the driving arrangement.

As already indicated above, it can be provided that the mechanical actuator can be actuated electromechanically, in particular via a spindle drive that can be motor-controlled.

In respect of the driving arrangement, it is possible for the latter to comprise a ring made of elastically deformable material, in particular a rubber ring. A simple and inexpensive variant is obtained, for example, if it is provided that the ring made of elastically deformable material is disposed directly or indirectly, via a guide ring or control ring connected to the latter, in a movable manner on the actuator. As an alternative to this, in the case of one embodiment of the invention it can be provided that the driving arrangement has a spring element, which biases a rigid driving ring into a predefined initial position. The control ring in this case can be disposed, largely without friction and with radial clearance, on the actuator, within the movement region. For the purpose of simple assembly, in the case of this embodiment variant it is appropriate for at least one removable retaining ring to be arranged as a stop. The ring made of elastically deformable material is connected to the control ring by, for example, adhesive bonding or by being vulcanized on.

As a further alternative embodiment of the invention, it can be provided that the driving arrangement has a spring element that biases a rigid driving ring into an initial position. In this case, it is possible for the spring element to comprise a coil spring, spiral spring or disc spring. In this case, again, the driving ring, which is realized as a rigid element, for example composed of a plastic or metal part, has a friction fit with the actuating piston.

As already indicated above, the rollback function, in particular for actuation of the parking brake, is realized, according to the invention, in the region between the actuator and the actuating piston. Accordingly, in the case of a preferred development of the invention, it can be provided that disposed between the actuating piston and the housing there is a hydraulic seal arrangement, which remains substantially without deformation in the case of an actuation in the direction of actuation. This means that, in the case of this embodiment variant, the rollback function remains largely suppressed in the region of the hydraulic seal between the actuating piston and the housing.

Other advantages of this invention will become apparent to those skilled in the art from the following detailed description of the preferred embodiments, when read in light of the accompanying drawings.

DETAILED DESCRIPTION OF THE INVENTION

Figure 1:
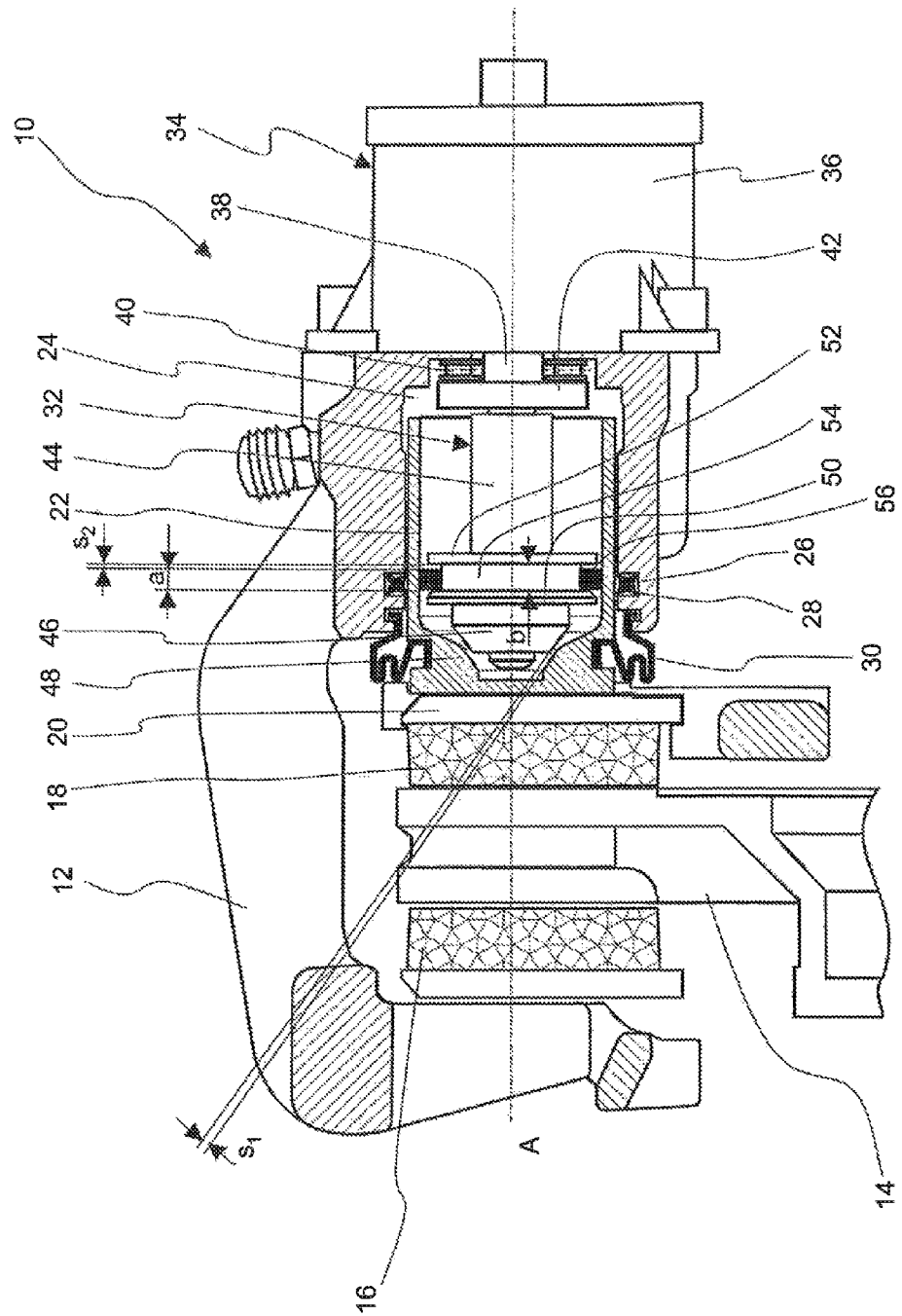
FIG. 1 shows a partial sectional view of a disc brake arrangement according to the invention, in the release position.

In FIG. 1, a disc brake arrangement according to the invention is represented in a partial sectional view and denoted in general by 10. This disc brake arrangement comprises a brake calliper 12, which is mounted in a floating manner by means of a brake carrier, not shown, in a usual manner, and which spans a brake disc 14 that is coupled to a vehicle wheel in a rotationally fixed manner. Provided in the brake calliper 12 there is a brake lining arrangement, which has a brake lining 16 that bears on the brake calliper 12, and has a brake lining 18 that bears on the actuating piston 22. The two brake linings 16 and 18 face towards each other and, in the release position shown in FIG. 1, are disposed with a small air clearance on both sides of the brake disc 14, such that no significant residual drag moments occur. By means of a brake lining carrier 20, the brake lining 18 is disposed on an actuating piston 22, for the purpose of moving jointly. The actuating piston 22 is mounted in a movable manner in a cylindrical cavity 24 in the brake calliper 12. In the region of this cavity 24 that is next to the brake disc, there is a full-perimeter receiving groove 26, in which an annular sealing element 28 is accommodated. The sealing element 28 has a cross-shaped or X-shaped contour in cross section, and has the property of keeping the friction low in respect of the actuating piston 22 as the latter is displaced along the longitudinal axis A.

In addition, it can be seen that, at its end that is on the left and that faces towards the brake disc 14 in FIG. 1, the actuating piston 22 is provided with a full-perimeter bellows 30, which prevents dirt from being able to enter the region between the actuating piston 22 and the full-perimeter wall defining the receiving cavity 24 of the brake calliper 12.

In addition, it can be seen in FIG. 1 that the actuating piston 22 is realized so as to be hollow. Accommodated in this actuating piston there is a thrust piece 32 of an electromechanical actuating arrangement 34. The electromechanical actuating arrangement 34 comprises a drive assembly 36 having an electric motor and a transmission arrangement. An output shaft 38 of this drive assembly 36 drives a drive spindle 42, which is supported via an axial bearing 40 and which is accommodated in a threaded manner in a threaded receiver 44 of the thrust piece 32.

In its region that is on the left and that faces towards the brake disc 14 in FIG. 1, the thrust piece 32 has a conical portion 46, which can be brought into bearing contact with a complementarily conical inner surface 48 of the actuating piston 22. In the release position shown in FIG. 1, there is a clearance $S_1$ between the two conical faces 46 and 48.

Between the conical region 46 and the receiving portion 44, the thrust piece 32 has two flanges 50, 52, between which an annular, cylindrical movement region 54 is enclosed. A ring element 56 made of elastomer material is accommodated in this movement region 54. The ring element 56 has an axial length a that is less, by the clearance $S_2$, than the axial width b of the movement region 54. The ring 56 constitutes a driving arrangement. It is realized so as to be slightly larger than the inner diameter of the actuating piston 22, and bears on the inner circumferential surface of the latter with a friction fit. In the movement region 54, the ring 56 can slip when subjected to a certain amount of friction. In the position shown in FIG. 1, the ring 56, owing to the friction fit mentioned previously, retains the actuating piston 22 against a movement towards the brake disc 14, in the axial direction A. In this state, neither of the brake linings 16 and 18 bears on the brake disc 14. There are no significant residual drag moments that result in wear on the brake linings 16, 18 or in increased fuel consumption during travel of a motor vehicle equipped with the brake arrangement 10.

If, during travel, the brake is then actuated hydraulically by the driver via the brake pedal or via a drive assistance system, the hydraulic fluid is subjected to pressure, in a manner known per se, in the cavity 24, such that the actuating piston 22 is displaced to the left along the longitudinal axis A in FIG. 1. As a consequence, the brake lining 18 is pressed on to the brake disc 14 by means of the floating calliper arrangement, in a manner known per se, and, at the same time, a corresponding displacement of the brake calliper 12 on the other side of the brake disc 14 causes the brake lining 16 to be drawn against the latter. This state is shown in the enlarged partial sectional view according to FIG. 2.

Figure 2:
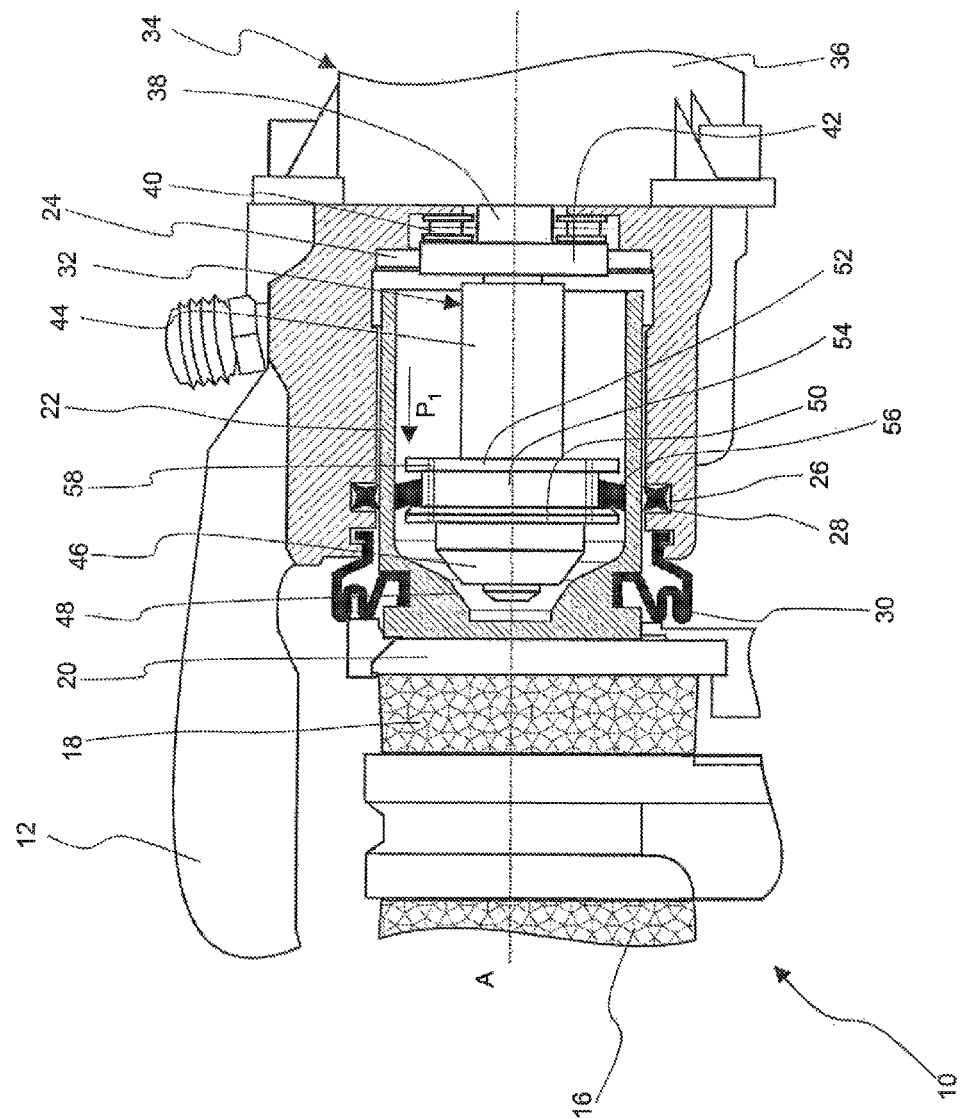
FIG. 2 shows an enlarged view of the arrangement according to FIG. 1, in a hydraulically actuated position.

As a result of the application of pressurized hydraulic fluid to the interior 24, the actuating piston 22 is displaced to the left, along the longitudinal axis A, in FIG. 2. The radially outer sealing element 28 in this case does not counteract the movement with any significant resistance, but merely effects a hydraulic seal of the movably guided actuating piston 22. The thrust piece 32 remains unactuated, and therefore also remains at its initial axial position. Owing to the displacement of the actuating piston 22 according to the arrow P1, and the previously mentioned friction fit at the outer circumference of the ring 56, which acts as a driving arrangement, the ring 56 becomes deformed into a parallelogram shape, as shown in FIG. 2. The stop 50 prevents the ring 56 from slipping off to the left in the axial direction. It can be seen that the stop 50 is realized with a deformation phase, which controls the deformation of the ring 56 in a predefined manner. It is to be noted that the thrust piece has axial through-holes 58, such that the hydraulic pressure is applied on both sides of the ring 56.

If the hydraulic pressure in the interior 24 of the brake calliper 12 is then reduced, for example as a result of release of the brake pedal or deactivation of the drive assistance programme, the ring 56 can relax elastically again, and assumes its initial shape, as in FIG. 1. This means that, in the course of its elastic relaxation, it draws the actuating piston 22 back out of the actuating position shown in FIG. 2, and thus puts the brake into its initial state. This corresponds to the rollback function, known per se, which, however, in the case of conventional brakes, is achieved by means of the outer seal at the outer circumference of the actuating piston, through appropriate design of the ring seals provided there. According to the invention, this rollback function is achieved by means of the ring 56 realized as a driving arrangement. Throughout the entire period of operation, including in the case of the brake linings 16, 18 having become worn, the clearance $S_1$ in the initial state according to FIG. 1 is held substantially constant by a software-controlled adjustment.

For the purpose of activating the parking brake, in an operating mode according to the invention, in a manner similar to an activation of the service brake, the actuating piston 22 is first put into an active braking position through application of a hydraulic pressure, as shown in FIG. 2. Actuation of the electromechanical actuator 34 then causes the thrust piece to be displaced forwards, according to the arrow $P_2$ in FIG. 3, until the clearance $S_1$ (see FIG. 1) has been used up and the conical face 46 bears on the corresponding conical face 48 inside the actuating piston 22. As a result, a situation can be achieved whereby the actuating piston 22 is axially supported, via the thrust piece 32 and the axial bearing 40, on the housing of the brake calliper 12. This state can be seen in FIG. 3. It is evident in this case that, owing to the displacement of the thrust piece 44, the ring 56, which, at its outer circumference, is in frictional engagement with the inner circumferential surface of the actuating piston 22, has been displaced to the right in FIG. 3, inside the movement region 50, relative to the thrust piece 32, until it bears on the other stop 52 (being the right stop in FIG. 3).

Figure 3:
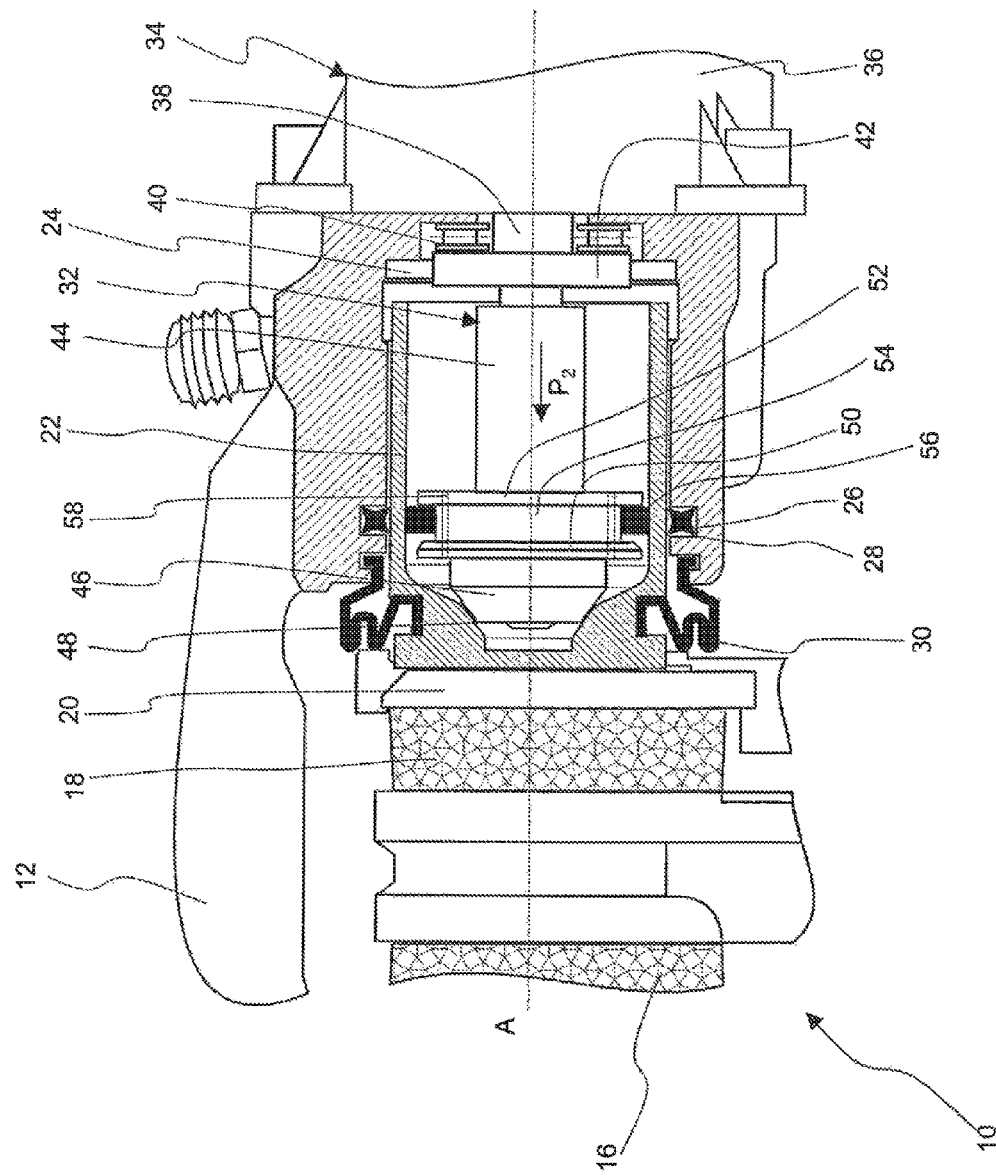
FIG. 3 shows a view corresponding to FIG. 2, in an electromechanically actuated position.

Once the state according to FIG. 3 has been attained, the hydraulic pressure in the cavity 24 can be removed again. The parking brake state is maintained because of the position of the thrust piece 44 and because of self-arresting (for example, by a self-arresting transmission between the spindle 42 and the receiver 44). The brake linings 16, 18 pressing against the brake disc 14 are supported via the thrust piece 32.

Figure 4:
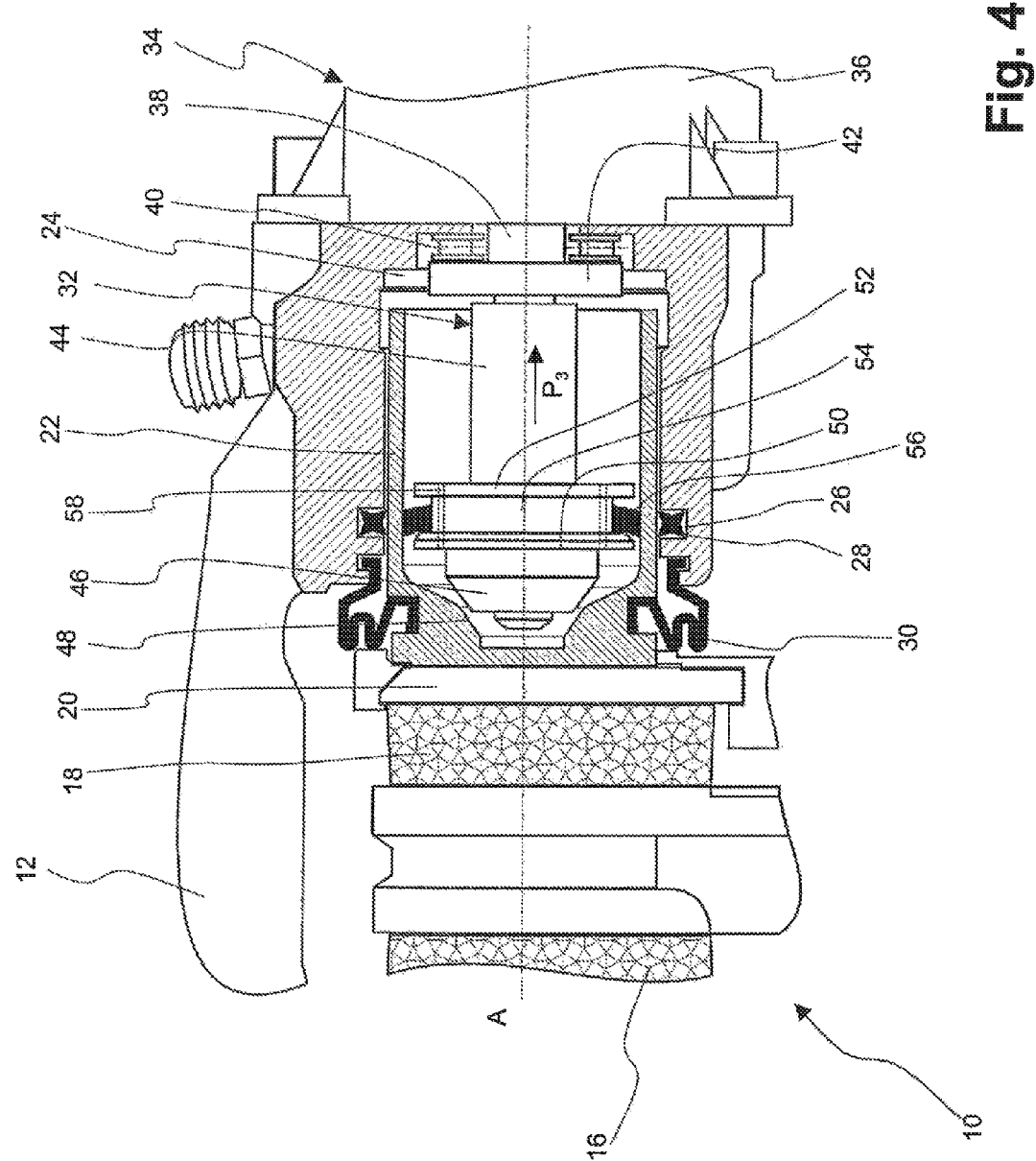
FIG. 4 shows a view corresponding to FIGS. 2 and 3, after the release of the electromechanical position and with hydraulic takeover of the brake position.

If the parking brake state according to FIG. 3 is then to be released again, then, in an operational variant of the invention, pressurized hydraulic fluid is again introduced into the cavity 24. As a result, the actuating piston 22 is displaced slightly to the left, in the axial direction A, such that the thrust piece 32 is relieved of load axially. Through control of the actuating arrangement 34, the thrust piece 32 can be displaced back into its initial position according to FIG. 1, as shown in FIG. 4 and emphasized by the arrow $P_3$. In this case, again, it is evident that the ring 56 of the driving arrangement is deformed in the manner of a parallelogram, corresponding to the deformation from FIG. 2. The explanation for this is that the thrust piece 32 is drawn back, in respect of the actuating piston 22 hydraulically loaded towards the brake disc 14, to such an extent that the ring 56, starting from its position according to FIG. 3, is displaced to the left inside the movement region 54 and ultimately even undergoes elastic deformation, owing to the bearing contact on the flange 50, as shown in FIG. 4. The transition from FIG. 3 to FIG. 4 can be referred to as "hydraulic takeover of the braking action". If the hydraulic pressure in the interior 24 is then removed again, the elastic relaxation of the ring 56 causes the actuating piston 22 to be displaced back into its initial position shown in FIG. 1, as has already been described with respect to FIG. 2. This restoring movement, likewise, is similar to the rollback function, but for releasing the parking brake.

Figure 5:
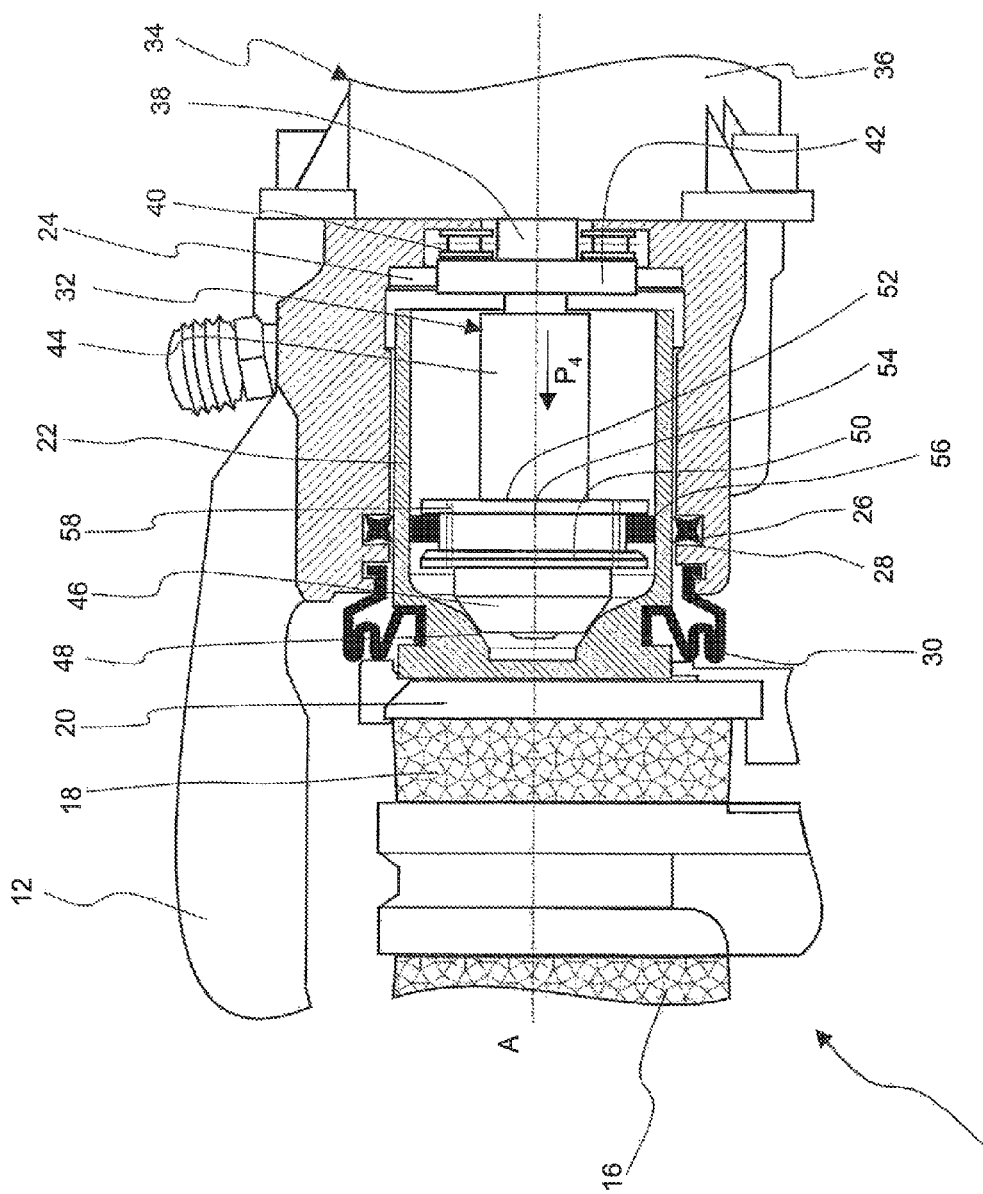
FIG. 5 shows a view corresponding to FIGS. 2 to 4, in the case of an electromechanically actuated position.

FIG. 5 shows a state in which, starting from the release position according to FIG. 1, a purely electromechanical actuation is effected. In this case, control of the electromechanical actuating device 34 causes the thrust piece 32, together with the actuating piston 22, to be displaced to the left in the axial direction A, according to the arrow $P_4$, in order to displace the actuating piston 22 on to the brake disc 14, with the conical faces 46, 48 being in mutual bearing contact, and thus to achieve a parking brake action. The actuating piston 22 in this case remains without hydraulic load, i.e. no hydraulic pressure is fed into the cavity 24. In respect of the driving arrangement 56, it can be seen that a state corresponding to that according to FIG. 3 is attained. This means that the ring 56 bears on the right flange 52, and is substantially not elastically deformed.

Figure 6:
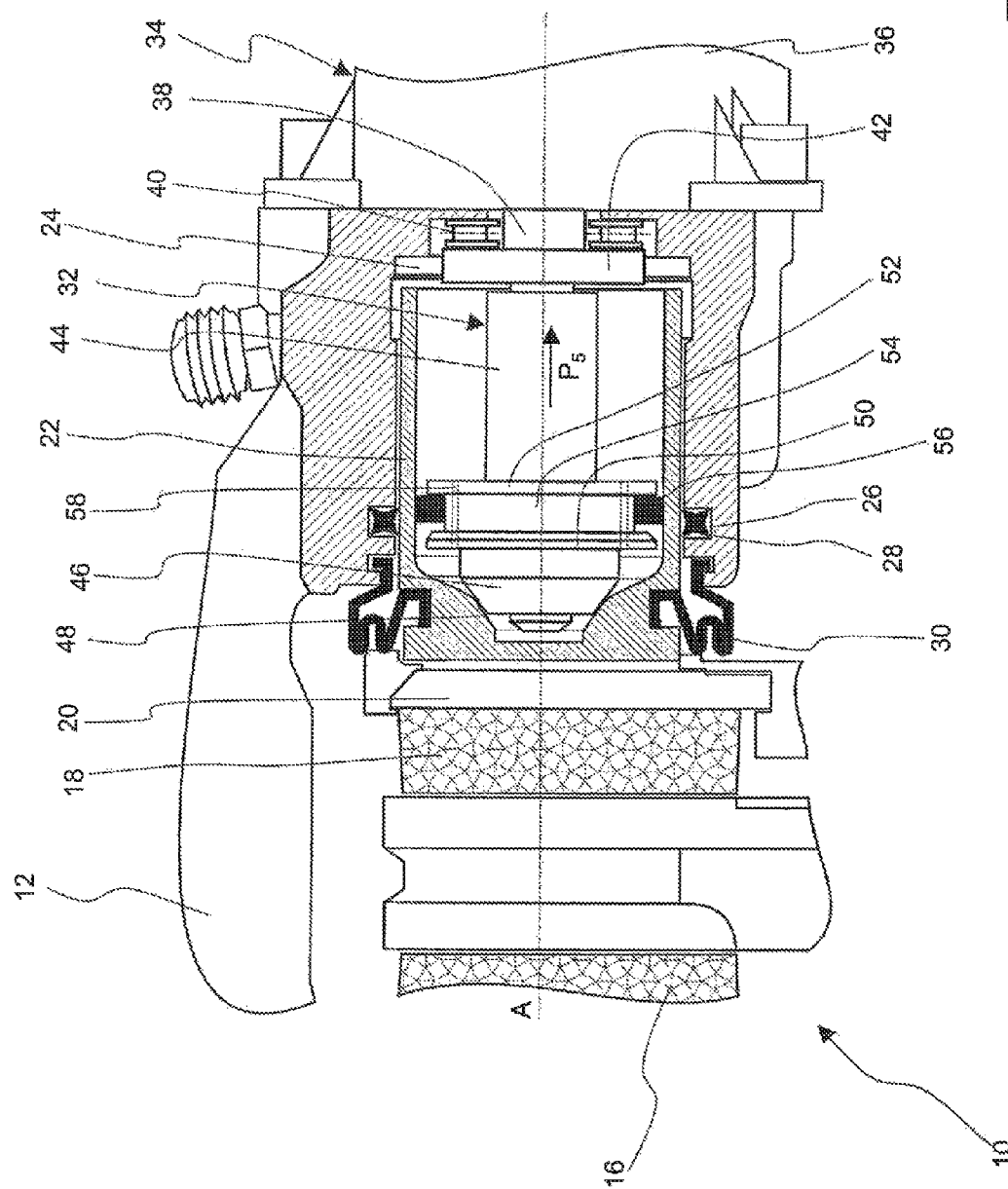
FIG. 6 shows a view corresponding to FIGS. 2 to 5, after the release of an electromechanically actuated position, without hydraulic takeover of the actuating position.

FIG. 6 shows a state that is attained when the parking brake 10 is released in a purely electromechanical manner, i.e. again without hydraulic takeover, or without hydraulic support through application of hydraulic pressure to the cavity 24. In this case, the thrust piece is drawn back, according to the arrow P5, through control of the electromechanical actuating device 34. Owing to the driving action of the ring 56, the actuating piston 22 is drawn back correspondingly, until ultimately the initial state according to FIG. 1 has been attained.

The functional states of the first embodiment of the invention that have been described above show that the rollback function, as known from conventional disc brake arrangements and achieved therein at the outer circumference of the actuating piston, is displaced, according to the invention, into the inner region of the actuating piston, namely, by fitting the ring 56 between the inner circumference of the actuating piston 22 and the thrust piece 32 of the electromechanical actuator 34. This makes it possible to achieve a situation whereby, irrespective of the actual brake actuation, whether it be as a consequence of a typical hydraulic actuation or as a consequence of a purely mechanical actuation by means of the electromechanical actuating device, it is always ensured that the actuating piston is drawn back sufficiently, and therefore that the brake disc is released as a result of the actuating piston 22 being drawn back to a sufficient extent. As a result, residual drag moments can be reliably prevented, even for disc brake arrangements having an integrated parking brake function (so-called EPBs (electronic parking brake)), and unnecessary fuel consumption due to residual drag moments can therefore be prevented.

Figure 7:
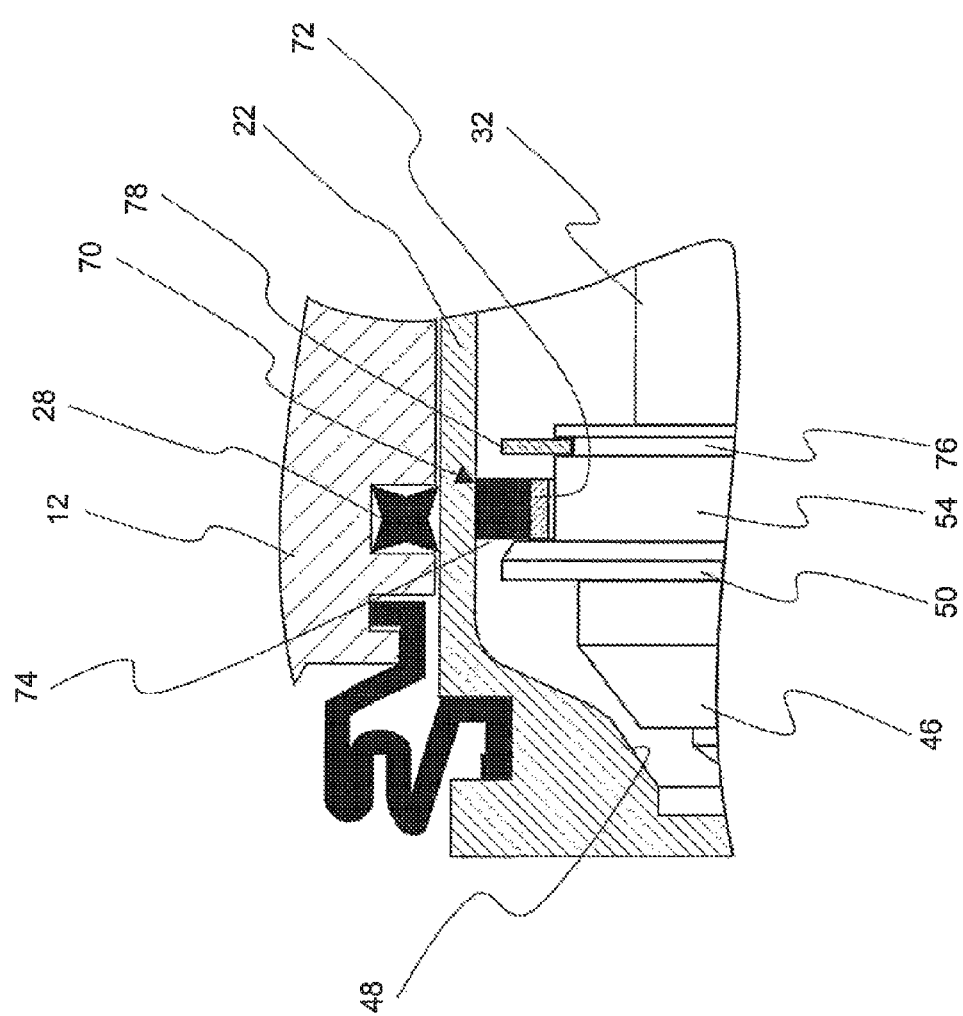
FIG. 7 shows an enlarged view of the driving arrangement in the case of a second embodiment of the invention.

FIG. 7 now shows a modified embodiment of the driving arrangement, in an enlarged partial sectional view. Those components that remain unchanged from the first embodiment according to FIGS. 1 to 6 are denoted by the same references. In the case of the embodiment according to FIG. 7, the driving ring is denoted by the reference 70. This driving ring is realized in two parts. It has a rigid, dimensionally stable guide ring 72, which is placed on the thrust piece 32 with radial clearance in relation to the outer circumferential surface of the movement region 54. On its outer circumferential region, a rubber ring 74 is placed on the guide ring 72 and fastened thereto by adhesive bonding or by being vulcanized on. The rubber ring 74, in turn, is oversized in relation to the inner diameter of the actuating piston 22, such that a friction fit is constituted between the ring 74 and the actuating piston 22. To enable assembly to be effected, i.e. in order to bring the driving arrangement 70 into the movement region 54, the flange 52 has been removed, as compared with the first embodiment. Instead, an annular groove 76 has been provided, in which a retaining ring 78 has been inserted.

The functioning of the embodiment according to FIG. 7 corresponds to the functioning according to the embodiment described with reference to FIGS. 1 to 6. The use of a rigid guide ring 72 enables the driving arrangement 70 to be more easily moved within the movement region 54, between the two stops 50 and 78. However, the elastic deformation of the part 74 of the ring 78 is still ensured, such that the previously described rollback function is also provided, without change, for operation of the parking brake.

Figure 8:
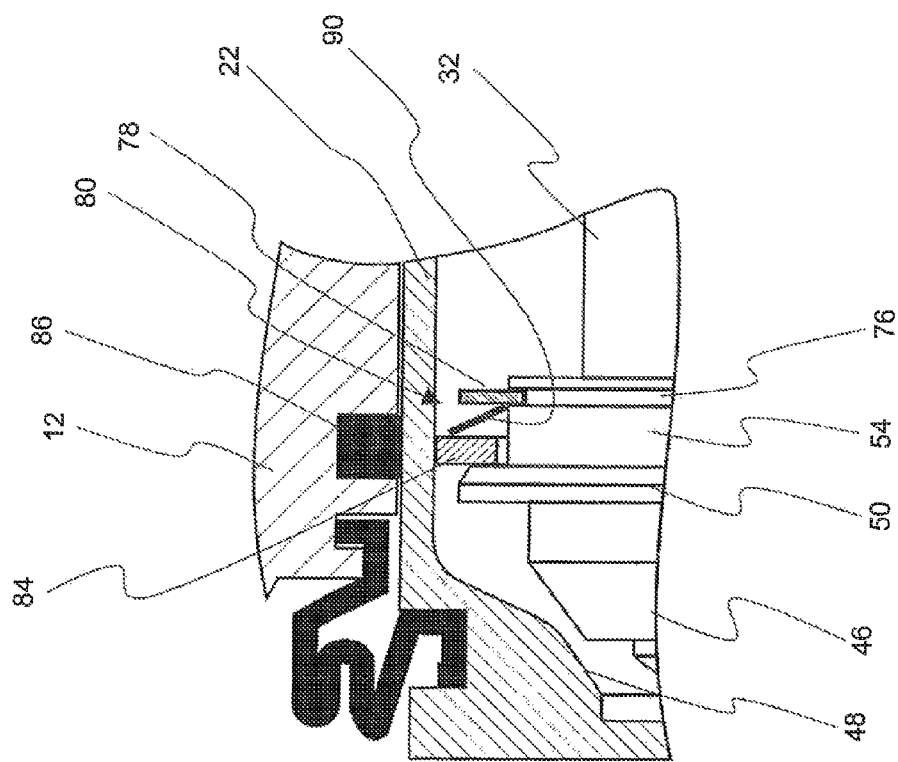
FIG. 8 shows a view corresponding to FIG. 7, in the case of a further embodiment of the invention.

FIG. 8 shows a further embodiment of the driving arrangement according to the invention. Instead of the use of an elastomer rubber ring, in the case of the driving arrangement denoted by the reference 80 a conical spiral spring 82 is used, which biases a stiff driving ring 84 against the flange 50. At its other end, the spring 82 is supported on the retaining ring 78, which is accommodated in the groove 76. The driving ring 84 is again realized with radial clearance relative to the outer circumferential surface of the movement region 54. The radial outer seal 86 on the actuating piston 22 is realized in a conventional manner, and provides a normal rollback function.

In the case of this embodiment, in the course of a normal (hydraulic) braking there is a relative movement between the driving ring 84 and the actuating piston 22, the actuating piston 22 slipping through when actuated with sufficient force relative to the driving ring 84. If the brake is then released again, the known rollback function of the sealing element 86 draws the brake piston 22 back, with the spring element 82 providing only a slight resistance to the driving of the driving ring 84. If the thrust piece 32 is moved to the left in FIG. 8 for the purpose of activating a parking brake function, such that it drives the driving ring 84 by means of the retaining ring 78 and the spring action, the driving ring slips relative to the actuating piston 22. When the parking brake action is released, the thrust piece 32 is drawn back, the driving ring 84 first driving the actuating piston 22.

The spring element 82 provides only small spring forces in each case.

Figure 9:
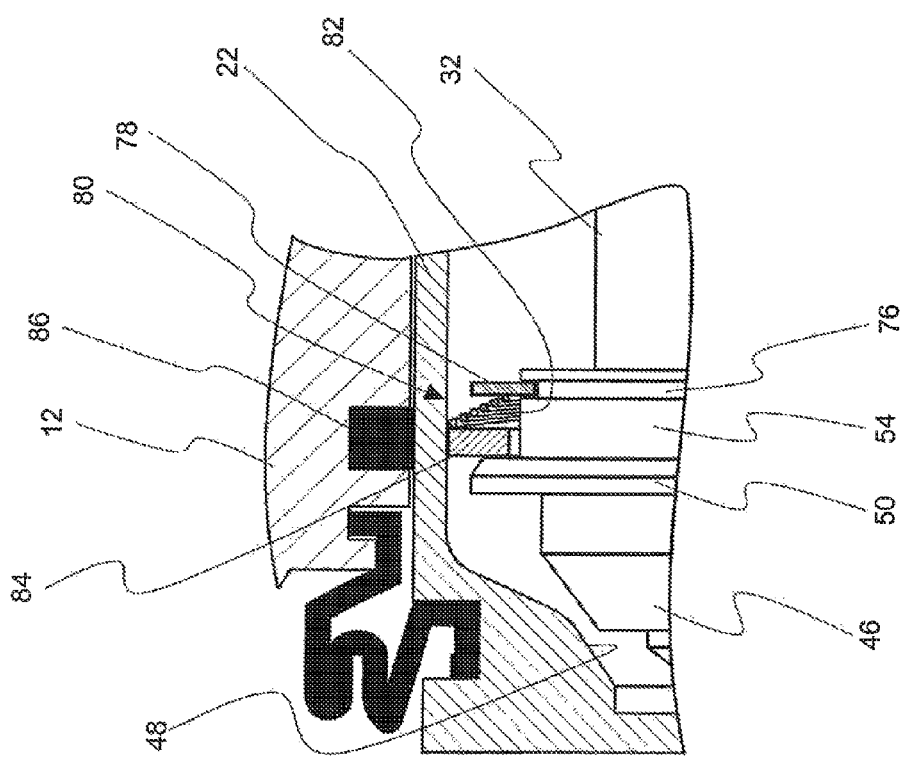
FIG. 9 shows a view corresponding to FIG. 8, in the case of a further embodiment of the invention.

FIG. 9 now shows a modification of the embodiment according to FIG. 8. In the case of this solution, the conical spiral spring 82 has been replaced by a disc spring 90. Otherwise, the arrangement functions in a manner identical to that described with reference to FIG. 8.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A disc brake for a motor vehicle, wherein the disc brake comprises a housing, a brake disc that is rotatable relative to the housing, at least one friction lining, and at least one actuating device realized to effect a relative movement between the brake disc and the friction lining, such that the friction lining can be brought into bearing contact with the brake disc,
    wherein the actuating device has at least one actuating piston, which is guided displaceably in the housing in a hydraulically sealing manner, wherein the actuating piston is displaceable in the housing hydraulically and/or via a mechanical actuator,
    wherein the actuating piston is coupled to the mechanical actuator via an elastically deformable driving arrangement, wherein, as a consequence of a relative displacement between the actuating piston and the actuator, the driving arrangement provides a restoring movement in accordance with the elastic deformation,
    wherein the driving arrangement is accommodated with a friction fit in the actuating piston and is movable relative to the mechanical actuator, wherein the mechanical actuator provides a limited movement region in which the driving arrangement is accommodated and is displaceable.

2. The disc brake according to claim 1,
wherein the movement region is realized so as to be greater than an axial length of the driving arrangement.

3. The disc brake according to claim 2,
wherein a distance by which the movement region is realized so as to be greater than the axial length of the driving arrangement determines a functional clearance that is dimensioned in such a way that the driving arrangement provides a restoring movement of the actuating piston as a consequence of a hydraulic brake actuation.

4. The disc brake according to claim 1,
wherein the movement region is delimited by a flange realized on the mechanical actuator or/and by a stop that can be attached to the actuator.

5. The disc brake according to claim 4,
wherein, on at least one side of the movement region, the flange or/and the stop is/are provided with a surface contour whose geometry is realized to achieve a desired deformation of the driving arrangement.

6. The disc brake according to claim 4,
wherein the stop is a retaining ring that can be attached to the actuator.

7. The disc brake according to claim 1,
wherein the driving arrangement comprises a ring made of elastically deformable material.

8. The disc brake according to claim 7,
the ring made of elastically deformable material is disposed directly or indirectly, via a control ring connected to the latter, in a movable manner on the actuator.

9. The disc brake according to claim 1,
wherein the driving arrangement has a spring element, which biases a rigid driving ring into an initial position.

10. The disc brake according to claim 9,
wherein the spring element comprises a coil spring, spiral spring or disc spring.

11. The disc brake according to claim 1,
wherein disposed between the actuating piston and the housing there is a hydraulic seal arrangement, which remains substantially without deformation in the case of an actuation in the direction of actuation.

12. The disc brake according to claim 1,
wherein the mechanical actuator can be actuated electromechanically.

13. The disc brake (10) according to claim 12,
wherein the mechanical actuator can be actuated electromechanically via a spindle drive that can be motor-controlled.

* * * * *